United States Patent [19]

Rimmell et al.

[11] Patent Number: 4,711,527

[45] Date of Patent: Dec. 8, 1987

[54] SIMULATED VEHICLE LAMP

[75] Inventors: Herbert D. Rimmell, Leonard; John W. Perkins, Rochester, both of Mich.

[73] Assignee: General Motors Corporation, Detroit, Mich.

[21] Appl. No.: 802,311

[22] Filed: Nov. 27, 1985

[51] Int. Cl.[4] .............................................. G02B 17/00

[52] U.S. Cl. .................................... 350/243; 350/446; 350/452

[58] Field of Search ............... 350/243, 242, 413, 422, 350/451, 452, 105, 1.6, 1.7, 446; 40/559, 564, 577, 615; 434/105, 370, 373

[56] References Cited

U.S. PATENT DOCUMENTS 3,590,509 7/1971 Fukumitsu .
3,665,177 5/1972 McLintic ............................. 350/1.6
3,797,917 3/1974 Barbour ............................. 350/452
3,861,785 6/1975 Barbour ............................. 350/446
4,130,346 12/1978 Polley ................................ 350/452
4,456,783 6/1984 Baker ................................. 350/451
4,457,585 7/1984 DuCorday .......................... 350/452
4,535,240 8/1985 Vigurs ................................ 350/452

*Primary Examiner*—John K. Corbin
*Assistant Examiner*—Loha Ben
*Attorney, Agent, or Firm*—R. L. Phillips

[57] ABSTRACT

A simulated vehicle lamp for use in modeling a vehicle comprises a pliable light reflecting sheet, a pliable simulated lens sheet, and a pliable magnifying lens sheet interposed between the light reflecting sheet and simulated lens sheet.

3 Claims, 1 Drawing Figure

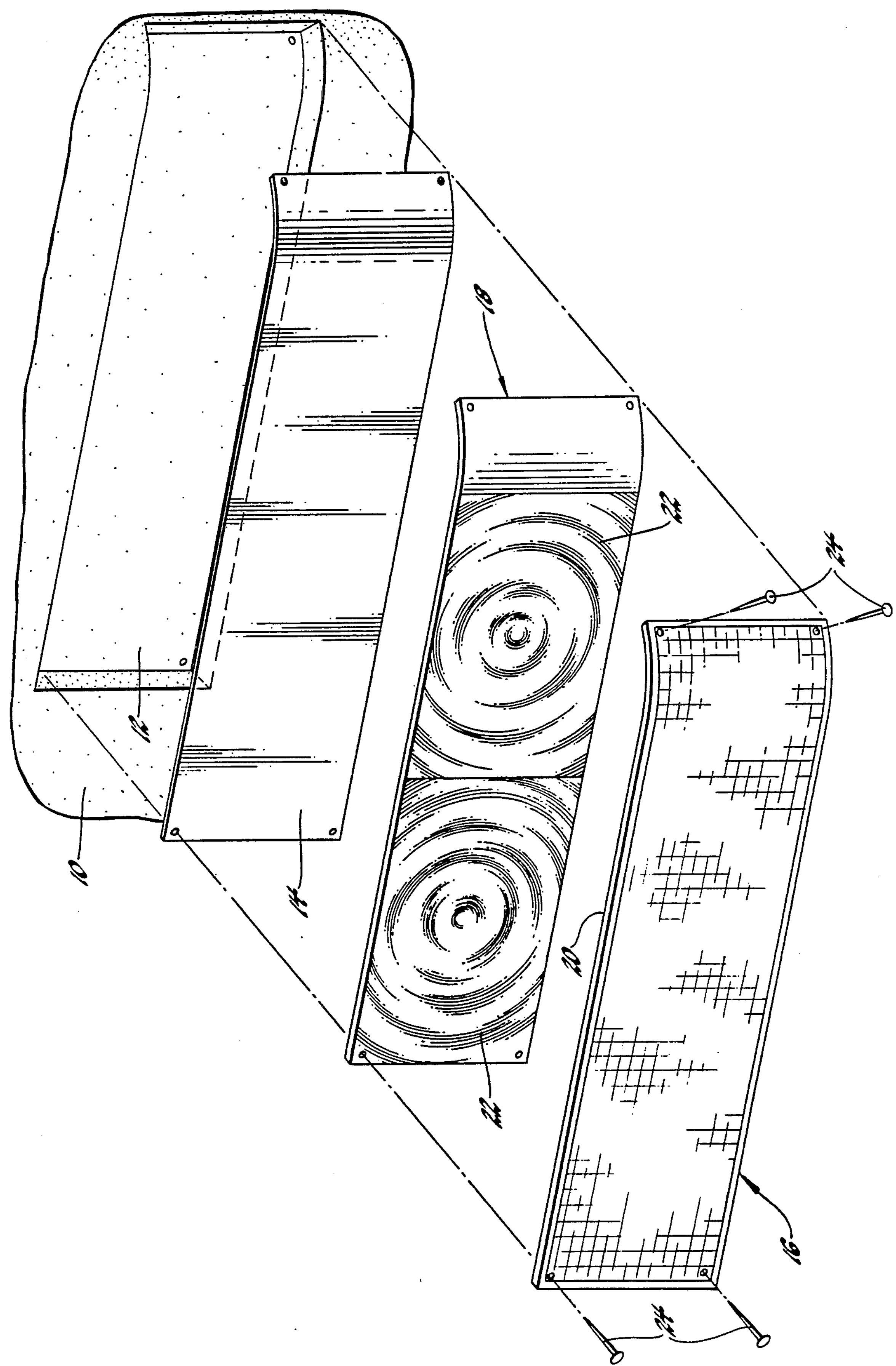
10
12
14
16
18
20
22
22
24
24

SIMULATED VEHICLE LAMP

TECHNICAL FIELD

This invention relates to vehicle lamps and more particularly to simulated lamps for use as design aids in designing vehicle exteriors including the lamps.

BACKGROUND OF THE INVENTION

In designing a vehicle's exterior including the lamps, it has long been the practice with the initial non-lighted vehicle models to nevertheless fabricate all the lamps after the manner of a working lamp in order to present the intended appearance. This process may require as much as several hundred hours of just modeling time alone to produce mockups of all the various vehicle lamps to be simulated such as headlamps, taillamps, brake lamps, parking lamps, backup lamps and cornering lamps. And then there is the time and cost of fabricating such mockups which typically are formed by casting.

SUMMARY OF THE INVENTION

The present invention combines off-the-shelf materials that may be fabricated and assembled in simple manner to form a simulated vehicle lamp having the desired exterior appearance and reflective depth yet is shallow in actual depth by not requiring a parabolically shaped reflective surface as is normally used. Instead, there is provided the illusion of a parabolic reflector of substantial reflective depth by the interposing of a thin magnifying lens sheet between a light reflecting sheet and an exterior simulated lens sheet having the desired surface appearance. Preferably, the reflector is metal foil and the magnifying lens is simply a thin, clear, plastic sheet having small concentric lens segments formed on one side thereof so as to produce a Fresnel type lens. The simulated lens on the other hand, apart from appearance, also serves as a window and may be a thin, clear, transparent, plain-surface plastic sheet or may be colored and/or have a special surface texture depending on the particular vehicle lamp to be simulated and the appearance desired.

DESCRIPTION OF PREFERRED EMBODIMENT OF THE INVENTION

These and other objects, advantages and features of the present invention will become more apparent from the following description and drawing in which there is shown in the sole FIGURE an exploded view of a simulated vehicle front headlamp embodying the preferred features of the present invention.

Referring to the drawing there is shown the left front end of a full size vehicle body 10 modeled in clay. For purposes of modeling the entire vehicle exterior, simulated lamps are added that have the appearance of the designer's intent for the actual vehicle to be ultimately produced. Typically, these lamps include headlamp, taillamp, brake lamp, parking lamp, backup lamp, and cornering lamp mockups. The details of the preferred embodiment of the present invention will be explained with reference to a simulated headlamp of generally rectangular shape for installation in an accommodating recess 12 in the front fender mockups (only the left front one being shown) and it will be understood that the invention is likewise applicable to the construction of the other lamps to be simulated or mocked up.

The simulated headlamp comprises only three basic parts; namely, a light reflecting sheet 14, a simulated lens sheet 16 and a magnifying lens sheet 18 interposed between the two former sheets. Preferably, the light reflecting sheet is metal foil such as chrome foil but could also be formed from mirror stock and the simulated lens is thin (e.g. $<0.040''$), transparent, plastic sheet which for headlamp appearance is clear and has a textured surface 20 on the backside simulating that of a Fresnel lens. It will be understood that in the case of forming a simulated brake lamp on the other hand, the simulated lens would then be formed of a translucent red plastic sheet. The simulated lens as intended and disclosed according to the present invention may thus be properly defined as having the visual appearance but not the functional effect of an actual vehicle lamp light focusing lens.

The magnifying lens sheet is preferably fabricated of a thin (e.g. $<0.040''$), clear, plastic sheet with the magnifying effect provided by the formation on one side thereof of at least one set of concentric lens segments 22. These lens segments have a saw-toothed, cross-sectional pattern of varying tooth slope from center to edge so as to produce a Fresnel type lens which though lacking in high performance is very well suited to the use here where the appearance of depth is desired above good image quality. This form of lens is commonly available and very inexpensive as compared to single curved element magnifying lens and the more conventional curved segment Fresnel lens. Furthermore, this form of lens readily lends itself to the formation therewith of a twin lens arrangement as shown to give the appearance of a twin lamp. Moreover, the preferred form of magnifying lens fabricated in thin plastic sheet has the added advantage as compared with these other forms of lens of allowing a shallower simulated lamp construction such that only a shallow recess of uniform depth in the vehicle body is required to accommodate the whole simulated lamp assembly.

It is also preferred that the three sheets 14, 16 and 18 all be pliable so that they may be bent as shown to conform to the desired appearance contour which in this case requires a smooth bend at one end to conform to the corner of the fender. This is simply determined as shown by having the bottom of the accommodating recess parallel that of the desired lamp surface since the sandwiched sheet arrangement forming the simulated lamp has a uniform thickness.

The three sheets forming the simulated lamp are secured to each other and to the vehicle body mockup of brads 24 through holes formed in the four corners of the sheets. However, it will be understood that other forms of fasteners and also adhesives may be used. As installed, the three sheets form a three layer arrangement with the outer or simulated lens serving as a simple window to the intermediately located magnifying lens which through light reflection off the rear reflector gives the illusion of substantial interior depth like looking into an actual headlamp though the simulated lamp is only the thickness of the three sheets.

The above described embodiment is illustrative of the invention which may be modified within the scope of the appended claims.

The embodiments of the invention in which an exclusive property or privilege is claimed are defined as follows:

1. A simulated vehicle lamp for use in modeling a vehicle characterized by a light reflecting sheet, a simulated lens sheet having a textured surface giving the visual appearance but not the functional effect of an actual vehicle lamplight focusing lens, and a magnifying lens sheet interposed between said light reflecting sheet and said simulated lens sheet.

2. A simulated vehicle lamp for use in modeling a vehicle characterized by a pliable light reflecting sheet, a pliable simulated lens sheet having a textured surface giving the visual appearance but not the functional effect of an actual vehicle lamp light focusing lens, and a pliable magnifying lens sheet interposed between said light reflecting sheet and said simulated lens sheet.

3. A simulated vehicle lamp for use in modeling a vehicle characterized by a pliable light reflecting sheet formed of metal foil, a pliable simulated lens sheet formed of plastic sheet having a textured surface giving the visual appearance but not the functional effect of an actual vehicle lamp light focusing lens, and a pliable magnifying lens sheet formed of plastic sheet interposed between said light reflecting sheet and said simulated lens sheet.

* * * * *